United States Patent
Waller et al.

(10) Patent No.: US 6,393,776 B1
(45) Date of Patent: May 28, 2002

(54) TORNADO SHELTER WITH COMPOSITE STRUCTURE AND CONCRETE TUB ENCASEMENT

(76) Inventors: James E. Waller, HCR 77, Box 161, Altamont, TN (US) 37301; Ian E. McElwain, 5922 Cane Ridge Rd., Antioch, TN (US) 37013

( * ) Notice: Subject to any disclaimer, the term of this patent is extended or adjusted under 35 U.S.C. 154(b) by 0 days.

(21) Appl. No.: 09/535,103

(22) Filed: Mar. 24, 2000

(51) Int. Cl.$^7$ ............................................. E04H 9/14
(52) U.S. Cl. .................... 52/169.6; 52/169.9; 52/79.12; 52/783.19; 52/793.11; 52/741.12; 109/1 S; 109/82
(58) Field of Search ............................. 52/169.6, 169.9, 52/79.11, 79.12, 79.13, 783.19, 793.11, 794.1, 798.1, 741.12, 309.11, 783.11; 109/1 S, 78, 80, 82

(56) References Cited

U.S. PATENT DOCUMENTS

| | | | | |
|---|---|---|---|---|
| 2,616,283 A | * | 11/1952 | Branstrator et al. | 52/783.11 X |
| 2,871,802 A | * | 2/1959 | Fishler | 109/1 S |
| 2,887,759 A | * | 5/1959 | Brownell, Jr. | 52/741.12 |
| D242,924 S | | 1/1977 | McKnight | |
| 4,126,972 A | | 11/1978 | Silen | |
| 4,226,062 A | * | 10/1980 | Doane | 52/169.6 |
| 4,336,674 A | | 6/1982 | Weber | |

(List continued on next page.)

FOREIGN PATENT DOCUMENTS

JP        57-165530    * 10/1982 ................. 52/169.6

OTHER PUBLICATIONS

Remagen Corporation, The Closet Vault™ brochure, date unknown (4 pages) Remagen Corporation, P.O. Box 796, Monteagle, TN 37356.

Remagen Corporation brochure re: Remagen Storm-Closet™, Mar. 10, 2000 (2 pages) Remagen Corporation, P.O. Box 796, Monteagle, TN 37356.

Remagen Corporation, Closet Vault™ brochure, Sep. 3, 1997, (2 pages) Remagen Corporation, P.O. Box 796, Monteagle, TN 37356.

Remagen Corporation brochure re: Storm Shield™, (2 pages) Remagen Corporation, P.O. Box 796, Monteagle, TN 37356.

Remagen Corporation, Assembly Instructions for ClosetVault® & StormCloset™, Aug. 31, 1999 (36 pages), Remagen Corporation, P.O. Box 796, Monteagle, TN 37356.

Autoquip, Stormdorm, brochure, date unknown (1 page) Autoquip, Guthrie, OK.

Life Shield Inc., Step Shelters brochure, date unknown (2 pages) Life Shield Inc., P.O.Box 3, Milford, DE 19963.

*Primary Examiner*—Laura A. Callo
(74) *Attorney, Agent, or Firm*—David B. Pieper; Waddey & Patterson, PC (57) ABSTRACT

A protective shelter for installation above and in the ground including a superstructure style frame, a composite wall structure for absorbing energy from missile impacts, and a tub encased in a foundation. The invention also discloses a method for constructing a protective shelter including a tub form and a superstructure which includes utilizing the availability of the tub form to provide a downward force such that the superstructure is not floated out of the excavation when the encasement is poured and removing the downward force after the concrete encasement has reached initial set stage. A further disclosure of the invention includes an energy absorbing compound wall structure for dissipating, transferring, and converting to potential energy the kinetic energy of a missile impact. This wall structure includes a support frame with an exterior wall panel bonded to the frame, a ribbed inside wall panel bonded to the exterior wall panel and the frame, and an energy dissipation block fixably positioned between the inside wall panel ribs and the frame.

19 Claims, 7 Drawing Sheets

U.S. PATENT DOCUMENTS

| | | | |
|---|---|---|---|
| 4,490,864 A | | 1/1985 | Wicker, Jr. |
| 4,534,144 A | * | 8/1985 | Gustafsson et al. ........ 52/169.6 |
| 4,539,780 A | | 9/1985 | Rice |
| 4,615,158 A | | 10/1986 | Thornton |
| 4,631,038 A | | 12/1986 | Ritter et al. |
| 4,779,294 A | | 10/1988 | Miller |
| 4,955,166 A | | 9/1990 | Qualline et al. |
| 5,199,240 A | * | 4/1993 | Ewald, Jr. .................. 52/789.1 |
| 5,299,405 A | * | 4/1994 | Thompson ............... 52/783.11 |
| 5,315,794 A | * | 5/1994 | Pearson ................. 52/169.6 X |
| 5,376,315 A | | 12/1994 | Fricke |
| 5,481,837 A | | 1/1996 | Minks, Jr. |
| 5,724,774 A | | 3/1998 | Rooney |
| 5,749,181 A | * | 5/1998 | Bauman ..................... 52/169.6 |
| 5,813,174 A | | 9/1998 | Waller |
| 5,829,208 A | | 11/1998 | Townley |
| 5,870,866 A | | 2/1999 | Herndon |
| 5,904,446 A | | 5/1999 | Carlinsky et al. |
| 5,930,961 A | | 8/1999 | Beaudet |
| 6,061,976 A | * | 5/2000 | Willbanks, Jr. ............ 52/169.6 |
| 6,085,475 A | * | 7/2000 | Parks et al. ................ 52/169.6 |
| 6,131,343 A | * | 10/2000 | Jackson, Jr. ........... 52/169.6 X |
| 6,263,637 B1 | * | 7/2001 | Spene et al. ......... 52/742.14 X |

* cited by examiner

TORNADO SHELTER WITH COMPOSITE STRUCTURE AND CONCRETE TUB ENCASEMENT

BACKGROUND OF THE INVENTION

The present invention relates generally to shelters or protective buildings. More particularly, this invention pertains to a method and apparatus for a tornado shelter including a molded tub basin with anchored steel composite superstructure and landing deck.

Several United States Patents have been directed towards shelter structures. These include U.S. Pat. No. D 242,924, issued to McKnight on Jan. 4, 1977; U.S. Pat. No. 4,126,972, issued to Silen on Nov. 28, 1978; U.S. Pat. No. 4,336,674, issued to Weber on Jun. 29, 1982; U.S. Pat. No. 4,490,864, issued to Wicker, Jr. on Jan. 1, 1985; U.S. Pat. No. 4,539,780, issued to Rice on Sep. 10, 1985; U.S. Pat. No. 4,615,158, issued to Thornton on Oct. 7, 1986; U.S. Pat. No. 4,631,038, issued to Ritter et al. on Dec. 23, 1986; U.S. Pat. No. 4,779,294, issued to Miller on Oct. 25, 1988; U.S. Pat. No. 4,955,166, issued to Qualline et al. on Sep. 11, 1990; U.S. Pat. No. 5,376,315, issued to Fricke on Dec. 27, 1994; U.S. Pat. No. 5,481,837, issued to Minks, Jr. on Jan. 9, 1996; U.S. Pat. No. 5,724,774, issued to Rooney on Mar. 10, 1998; U.S. Pat. No. 5,829,208, issued to Townley on Nov. 3, 1998; U.S. Pat. No. 5,870,866, issued to Herndon on Feb. 16, 1999; U.S. Pat. No. 5,904,446, issued to Carlinsky et al. on May 18, 1999; and U.S. Pat. No. 5,930,961, issued to Beaudet on Aug. 3, 1999. A brief summary of the most pertinent of these patents is outlined in the following discussion.

U.S. Pat. No. 4,539,780, issued to Rice on Sep. 10, 1985, discloses a STORM CELLAR OR THE LIKE. This patent describes the insertion of a pre-cast molded concrete base into the ground as a base for an upper cast member. The upper and lower pre-cast sections are joined to form a completed storm cellar.

U.S. Pat. No. 4,615,158, issued to Thornton on Oct. 7, 1986, discloses a MOBILE HOME TORNADO SHELTER. The specification is directed towards a tornado shelter with the passageway connected to the interior of a mobile home.

U.S. Pat. No. 4,955,166, issued to Qualline et al. on Sep. 11, 1990, discloses a TORNADO UNDERGROUND SHELTER. This is a fiberglass unit that prefabricated and then transported for final constructed on site. The unit features an integral seat that is fabricated into the bottom surface and which also adds strength to the unit. In addition, the patent describes the use of the tornado shelter under a patio.

U.S. Pat. No. 5,481,837, issued to Minks, Jr. on Jan. 9, 1996, discloses a STORM SHELTER FOR USE WITH A MOBILE HOME. This patent describes the use of a shelter for a mobile home with the roof of the shelter forming a stoop for an entrance to the mobile home. The unit is constructed for prefabricated slabs of concrete that are bolted together on site.

None of this prior art discloses a protective shelter for installation above and in the ground including a superstructure style frame, a composite wall structure for absorbing energy from missile impacts, and a tub encased in a foundation. What is needed, then, is a improved method and apparatus for constructing a tornado shelter including a molded tub basin with anchored steel superstructure and landing deck.

SUMMARY OF THE INVENTION

A protective shelter for installation above and in the ground including a superstructure style frame, a composite wall structure for absorbing energy from missile impacts, and a tub encased in a foundation. The invention also discloses a method for constructing a protective shelter including a tub form and a superstructure which includes utilizing the availability of the tub form to provide a downward force such that the superstructure is not floated out of the excavation when the encasement is poured and removing the downward force after the concrete encasement has reached initial set stage. A further disclosure of the invention includes an energy absorbing compound wall structure for dissipating, transferring, and converting to potential energy the kinetic energy of a missile impact. This wall structure includes a support frame with an exterior wall panel bonded to the frame, a ribbed inside wall panel bonded to the exterior wall panel and the frame, and an energy dissipation block fixably positioned between the inside wall panel ribs and the frame.

In one of its exemplary forms, the present invention includes a protective shelter for installation above and in the ground which includes a superstructure including a top, a side, and a base connecting an above ground shelter portion and a below ground shelter portion. The above ground portion including a shelter roof deck supported on the top of the superstructure and a shelter wall attached to the side of the superstructure, and the below ground portion including a tub encased about the outside and underside with a concrete foundation encasement which secures the superstructure base in the ground and provides resistance against upward and lateral forces. This basic embodiment may include column legs secured in the concrete foundation encasement, wall top framing elements attached to the column legs, and wall bottom framing elements. A second embodiment may be constructed on a concrete slab with ground anchors as appropriate.

Further improvements to the basic structure of the shelter include encasement cross framing attached to the legs for supporting the tub and anchoring the superstructure in the encasement. This cross framing can be constructed using binders between the tube legs and tub supports spanning these binders to provide anchorage of the superstructure into the encasement, and also provide support and protection for the tub. Anchorage of the superstructure can be effectuated using leg base plates to provide anchorage into the encasement.

A shelter roof deck is taught which uses a concrete roof deck mounted on a ribbed panel with ribbed deck flutes and raised embossments for engaging the concrete roof deck. A wire reinforcing mesh is rigidly supported within the concrete roof deck at a distance between the ribbed deck flutes and the top of the wall top framing elements.

One important aspect of the present invention is the shelter wall that is constructed from a composite of materials including an exterior wall plate adhered to framing, an inside ribbed wall panel adhered to the exterior wall plate and the framing, and energy dissipation blocks adhered between the ribbed wall panel and the framing. This wall structure can include both ventilation systems and door hatches for access into the shelter. This structure teaches an energy-absorbing compound wall structure for taking the kinetic energy of a missile impact and dissipating, transferring, and converting the kinetic energy to potential energy. The potential energy is permanently or temporarily stored in the shelter walls for protecting objects stored in a protective area. The adhesive for bonding of the elements of the wall panels includes first, second, and third term strength properties which allow the adhesive to dissipate energy, transfer energy, hold energy within the wall structure, and release the temporarily stored potential energy in the wall after the objects have been removed from the protective area.

A further advantage of the present invention includes a water impervious tub to allow for the shelter to be employed in regions where the water table is close to the ground surface. The tub includes both vertical tub walls and horizontal surfaces to provide structural strength of the thin membrane form. These surfaces may be implemented as steps, tub seats, seat-backs, and a tub floor. The tub form includes a drain pipe and plug connected opening into a gravel drain for removing water from the tub.

The tub allows for an improved installation method for the structure including filling the tub with water to provide a downward force such that the superstructure is not floated out of the excavation when the encasement is poured, and removing the downward force after the concrete encasement has reached initial set stage.

DESCRIPTION OF THE PREFERRED EMBODIMENTS

As shown in FIGS. 1 through 7 of the drawings, a bi-level tornado shelter 100 is shown constructed on a steel superstructure 160 which joins an above ground shelter portion 102 and a below ground shelter portion 104. The above ground shelter portion 102 of the shelter 100 includes a shelter roof deck 108 which is positioned about three and one-half feet above the finished ground surface grade 106, shelter walls 142 joining the roof deck with the below ground shelter portion 104, and an access door assembly 110. The below ground portion 104 of the shelter 100 extends downward from the ground surface grade 106 for approximately one and one half feet and includes a tub 116 with a concrete foundation encasement 118. This combination of above ground and below ground construction provides for access and protection advantages for the present shelter 100 design.

The entrance height for most buildings is ideally placed in the general range of three and one half feet which allows for the shelter roof deck 108 of the present invention to be utilized as an entrance landing for access and egress from a building such as a residence, mobile home, or pre-manufactured residential building. The entrances to these buildings are generally at a consistent level of elevation above the finished grade 106, and it is envisioned that the design of the present invention may be adapted for varying entrance heights according to the particular application. An adjoining stairway 112, which is not part of this invention, is shown lightly in FIG. 1 for the purpose of showing the invention's use as an entrance stair landing into the building, which could lead from a building's exterior or interior, garage, basement, or the like. In addition to the stair landing application, the shelter roof deck 108, as described herein, may become the floor of an exterior or interior deck or building appurtenance, an in-residence or basement structure, or an isolated, outside, landscaping feature. A further advantage of the height of the present shelter 100 is that this height offers a relatively small area of presentation of the structure of the shelter 100 to horizontal tornado wind forces and wind-driven missile impacts. A still further advantage of this above ground height is that it allows for the shelter roof deck 108 to be placed high enough for horizontal access into the shelter 100 through a vertical door hatch assembly 110.

The habitable, below ground portion 104 of the shelter's 100 structure extends about one and one-half feet below finished grade 106, which permits installation of the shelter foundation 114 without excavating rock in a large part of the United States. A water impervious plastic tub 116 permits the shelter 100 to be employed in regions where the water table is close to the ground surface 106. The water impervious plastic tub 116 is encased about the outside and underside with a concrete foundation encasement 118 that causes the tub 116 to become rigid and provides the anchorage into the sub-grade 120, shown in FIG. 3, to resist upward and lateral wind forces of tornadoes with factors of safety of one hundred and fifty percent (150%) or more.

The Tub

Figure 3:
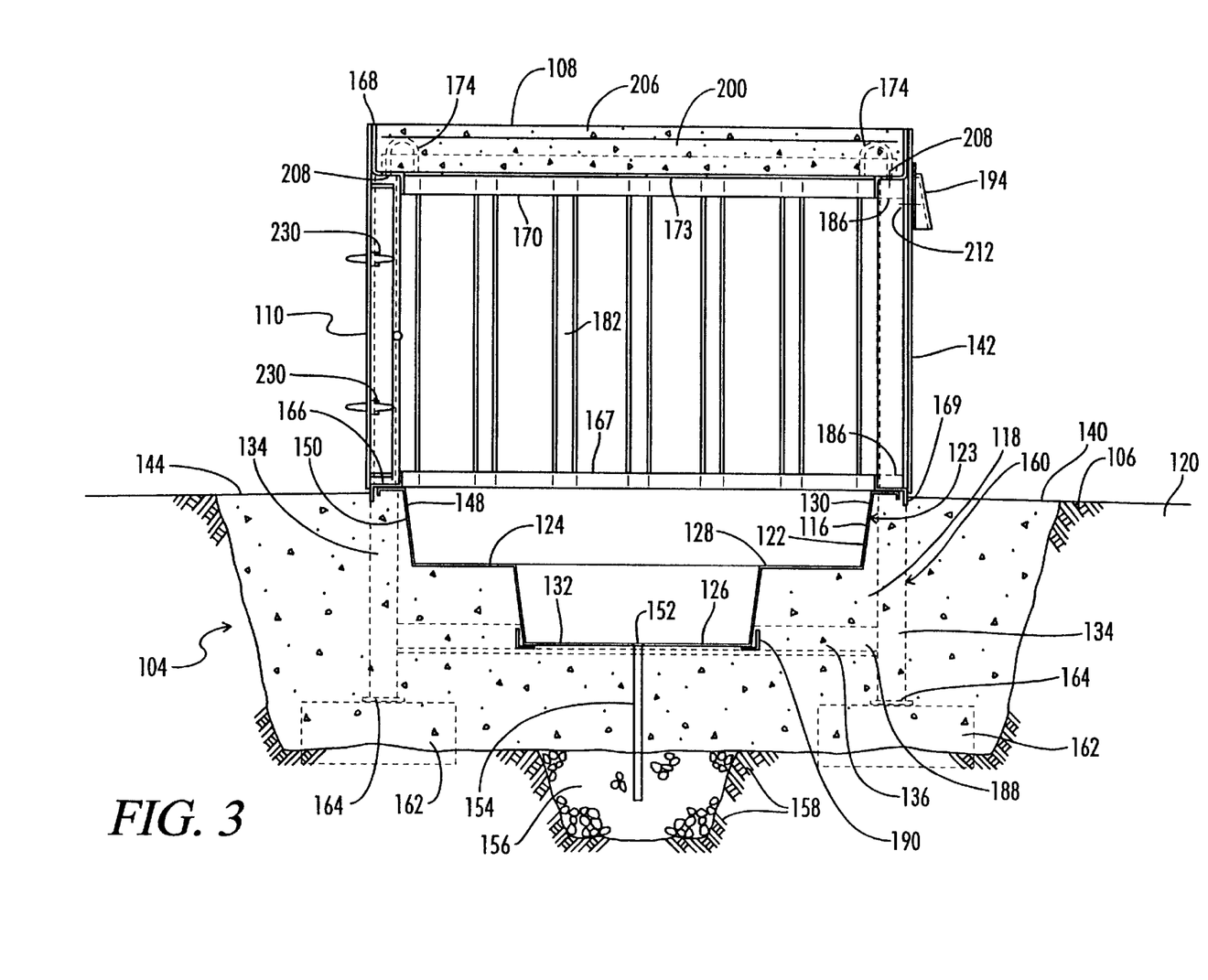
FIG. 3 is a cross section through of the shelter of the present invention showing the relationship between the superstructure framing including the composite wall structure, the concrete filled roof, the tub, and the concrete foundation encasement.

Referring to FIG. 3, the below ground portion 104 of the shelter 100 lies below the ground surface level 106 and includes a stepped, pre-molded tub or tank 116 that provides a water impervious shell 122, rigid and durable tub steps 124 for safe entrance, and rigid, non-abrasive tub surfaces 126 for tub seats 128, seat-backs 130, and a tub floor 132 for the shelter occupants. The tub 116 is generally constructed from a molded plastic approximately 0.15 inches in thickness and serves as a thin-membrane form for the on-site pouring of the concrete encasement 118 on the outside and underside of the tub 116. The concrete encasement 118, which is poured under and around the plastic tub 116, engages the superstructure frame 160, including the corner tube legs 134 and the encasement cross framing 136 of the superstructure frame 160 to provide the anchorage and ballast for resistance against windstorm uplift and overturning forces. The top edge 140 of the concrete foundation encasement 118 is trowel finished to a smooth finish that is sloped slightly away from the shelter walls 142. This slight sloping protects the adjacent grade from erosion and drains rainwater away from the shelter 100. The smooth concrete finish also forms the entrance slab 144 for one or more vertical door hatch assemblies 110.

A unique pressure balancing method is used to construct the concrete foundation encasement 118 under the tub 116. The tub 116 is initially filled with water and is left filled with water until the concrete foundation encasement 118 around and under the tub 116 is poured and has set. The water pressure on the tub inside surface 148 of the tub 116 offsets a large portion of the hydrostatic pressure on the underside 150 of the tub 116 which results from the upward hydrostatic pressure of the wet, plastic concrete used to form the concrete foundation encasement 118. This pressure balancing reduces the potential for deformation of the thin membrane tub 116 during placement of the concrete foundation encasement 118, leaving the tub 116 nearly the same shape as when manufactured. After the concrete encasement 118 has reached initial set stage, a plug 152 in the floor 132 of the tub 116 is removed. The tub water drains through a plastic drainpipe 154 into a gravel drain 156 and thence into the soil 158. The drainpipe 154 becomes a permanent drainpipe 154 to discharge water out of the shelter 100 through the tub bottom floor 132. Alternately, the drain plug 152 may be installed if the shelter 100 is constructed in regions where the water table lies very close to the ground surface grade 106.

Figure 1:
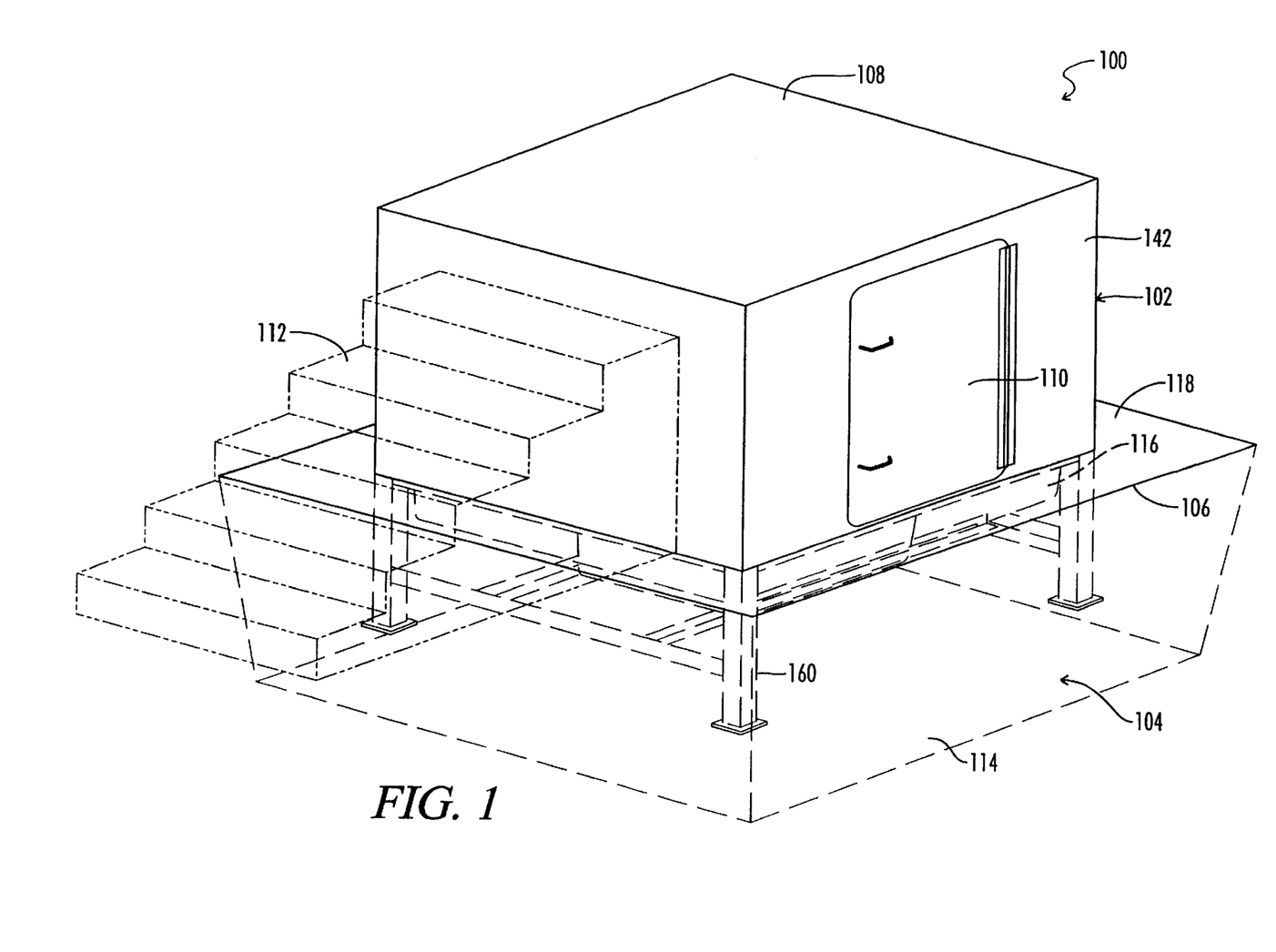
FIG. 1 is an isometric view of the shelter of the present invention.
Figure 2:
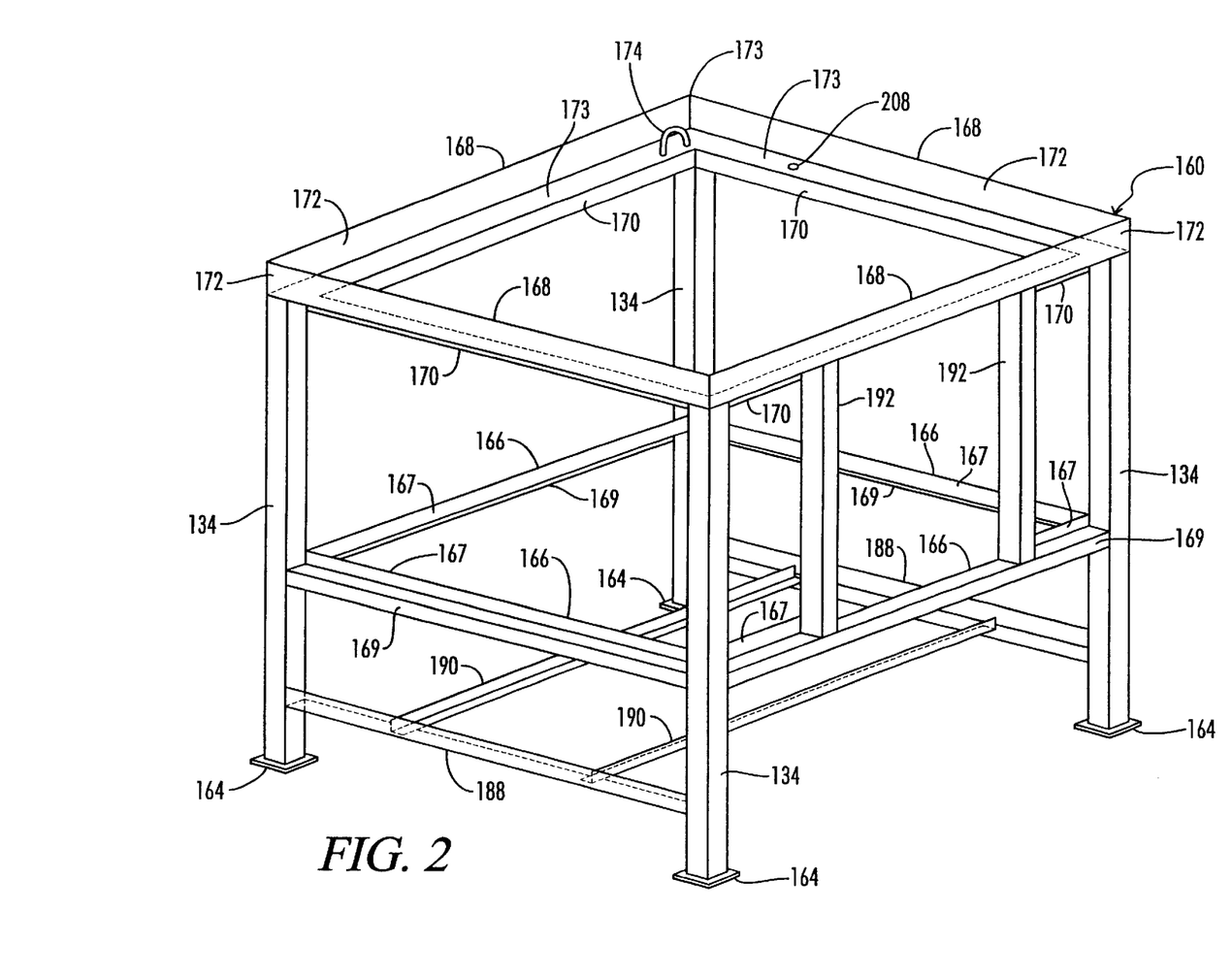
FIG. 2 is an isometric view of the superstructure framing of the present invention.

The second feature of the water filled tub 116 during construction is that the weight of the water in the filled tub 116, in addition to the weight of the steel superstructure 160, FIG. 2, steel walls 142, and concrete roof deck 108, which is poured and finished before the concrete foundation encasement 118 is poured, provides sufficient downward force such that the shelter superstructure 160 is not pushed up or "floated" out of the excavation when the concrete encasement 118 is poured. The net downward force during construction is approximately one hundred and twenty five percent (125%) to one hundred and thirty percent (130%) of the upward buoyancy force when the tub 116 is filled with water. If water was not present in the tub 116, the net upward force during construction would be approximately one hundred and ten percent (110%) to one hundred and twenty percent (120%) of the total downward force, resulting in the superstructure 160 "floating" up from its temporary concrete block supports 162.

The tub 116 design is also unique with respect to the structural strength which is provided against vertical forces by the nearly vertical tub surfaces 126 and against horizontal forces by the nearly horizontal surfaces which form the tub seats 128, tub steps 124 and bottom floor 132. Thus, the vertical and horizontal diaphragms of the plastic tub surfaces 126 provide structural strength of the thin membrane form for the wet foundation concrete and pressure balancing water fill in the tub. The hardened concrete foundation encasement 118 rigidly supports the plastic tub 116 and protects the tub 116 from external wind and earth pressures and impacts from wind-driven missiles.

The Steel Superstructure

Referring to FIGS. 2 and 3, the steel superstructure 160 is supported by four three inch square, fourteen gauge steel tube column legs 134 at each corner of the shelter 100 which support the superstructure 160 on seven gauge steel leg base plates 164 bearing on concrete blocks 162 placed in the foundation excavation. These steel tube column legs 134 become the steel tension elements anchoring the superstructure 160 to the concrete foundation encasement 118 to resist uplift and overturning. The steel tube column legs 134 are welded to horizontal zee-shaped, bent seven gauge steel plate wall top framing elements 168 at the edge of the shelter roof deck 108 and also horizontal zee-shaped, bent seven gauge steel plate wall bottom framing elements 166 at the interface between the pre-molded plastic tub 116, concrete foundation encasement 118, and the steel walls 142. The bottom outside vertical plate 169 of each horizontal, zee-shaped, steel wall bottom framing element 166 engages the concrete of the foundation encasement 118 and provides resistance to lateral movement at the bottom of the composite steel shelter walls 142. The top outside vertical plate 172 of each top horizontal, zee-shaped, steel element wall top framing element 168 comprises the permanent outside form for the composite concrete/steel roof deck 108. Three-eighths inch diameter bent steel bar lifting loops 174 are welded at the corners 176 of the roof peripheral steel framing 178 (FIG. 5) in the cavity 200 provided for pouring of the concrete roof deck 108.

The top inside vertical plate 167 of each horizontal, zee-shaped, steel wall bottom framing element 166 and the bottom inside vertical plate 170 of each top, horizontal, zee-shaped wall top framing element 168 comprise the inside support for three inch deep, twenty gauge, ribbed, steel wall panels 182 which form the inside part of the above ground, composite steel walls 142. These inside vertical plates 167, 170 transfer wind forces acting perpendicular to the above ground shelter walls 142 to the composite concrete/steel roof deck 108 at the top and to the concrete foundation encasement 118 at the bottom. The inside or interior, vertical plates 167, 170 of the horizontal, zee-shaped wall framing elements 166, 168 also resist impact forces perpendicular to the shelter walls 142. Strong and destructive impact forces will result in crushing of the wall panel ribs 185 of the ribbed steel wall panels 182 and the trapezoidal shaped, styrofoam energy dissipation blocks 186 adhered between the wall panel ribs 185 of the wall panel 182 and the inside vertical plates 167, 170 of the zee-shaped wall framing elements 166, 168.

Horizontal three inch by three inch by three-sixteenth inch thick steel angle binders 188 between the four corner, vertical tube legs 134 and horizontal two inch by two inch by three-sixteenths inch thick, steel angle tub supports 190 spanning at right angles to these binders 188 provide support against vertical movement of, and protection against damage to the plastic tub 116 during transport and erection. These steel binders 188, and tub supports 190 also provide additional anchorage of the steel superstructure 160 to the concrete foundation encasement 118 and means of rigidly anchoring the plastic tub 116 down during the time that the tub 116 is filled with water and the wet foundation concrete encasement 118 is tending to push upward on the bottom of the plastic tub 116. The concrete encasement 118, encasing the steel framing legs 134, leg binders 188, leg base plates 164, and tub supports 190 which lies below finished grade 106, protects these steel components from deterioration.

The Composite Concrete/Steel Roof Deck

The shelter superstructure 160, when shipped and prepared for erection, is a pre-fabricated unit consisting of four steel tube column legs 134 with steel leg base plates 164, steel angle cross binders 188, bent plate steel wall bottom framing element 166, wall top framing element 168, door support framing 192, composite steel walls 142 with passive air vent cowlings 194 and styrofoam support and rib energy dissipation blocks 186, one or more steel access doors 110 with continuous door hinge 196 and latching hardware 230, a plastic tub 116 and supporting steel tub supports 190, and a steel cavity 200 for an on-site poured concrete roof deck 108.

Figure 5:
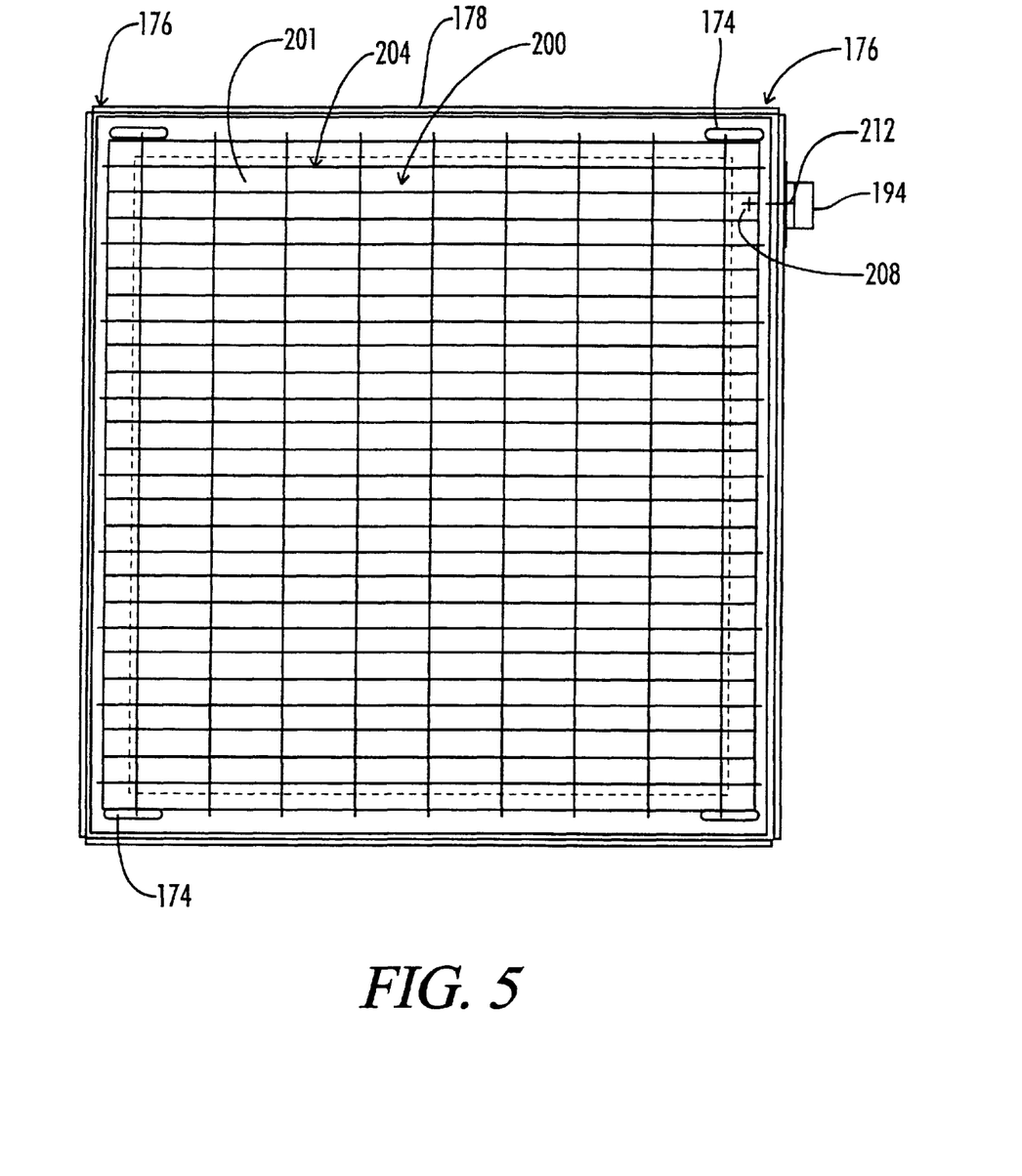
FIG. 5 is a top view of the roof cavity of the present invention.
Figure 6:
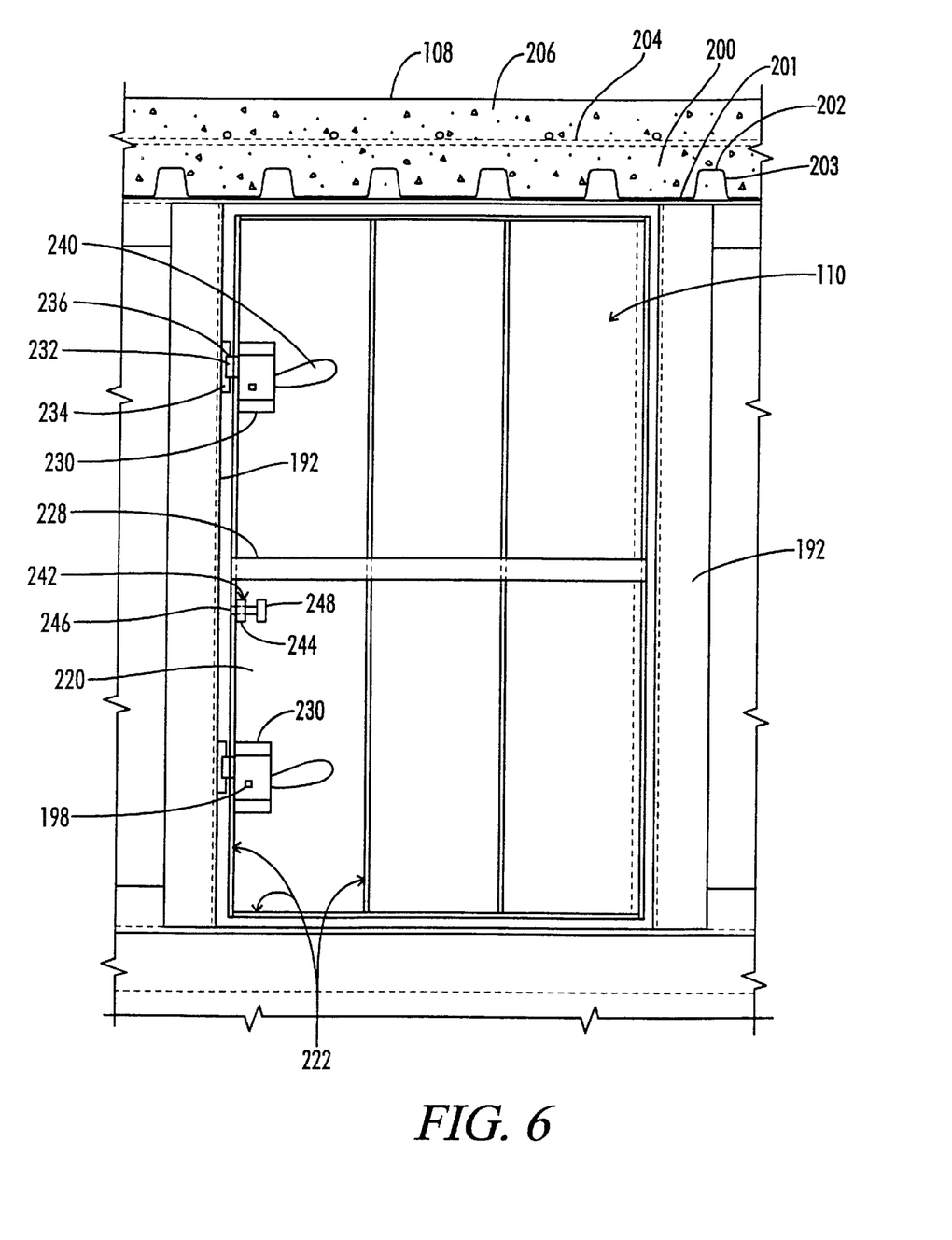
FIG. 6 is an inside view of the door hatch assembly of the present invention.

As shown in FIGS. 5 and 6, the steel cavity 200 consists of one and one-half inch deep, twenty gauge ribbed steel panel 201 with raised embossments 203 and a sheet of six gauge steel wire reinforcing mesh 204 with a six inch square grid rigidly supported at a distance between the top of the ribbed, steel deck flutes 202 and the top of the top outside vertical plates 172, and the top horizontal plate 173 of the top, horizontal, zee-shaped wall top framing elements 168, which form the roof peripheral steel framing 178. No concrete is introduced to the cavity 200 until the pre-fabricated shelter structure is erected, shimmed level, the plastic drain tube 154 is installed and the plastic tub 116 is plugged 152 and filled with water. Concrete is first poured into the cavity 200 for the roof deck 108. The weight of the concrete filled roof deck 108 is necessary to provide the ballast, in conjunction with filling the plastic tub 116 with water, to prevent the superstructure 160 from "floating" up from of the temporary concrete block supports 162 in the foundation excavation when the concrete foundation encasement 118 is poured.

The cavity 200 above the light gauge, embossed, steel panel 201 serves as the bottom form for the roof deck concrete 206. After construction is complete, the steel panel 201 serves as a protective barrier to protect occupants from being struck by spalled shards of roof deck concrete 206 in the event the reinforced, composite/steel roof deck 108 is impacted by a large missile or falling object during a tornado or other natural disaster. The roof deck concrete 206 acts compositely with the steel panel 201 by virtue of the steel embossments 203 on the steel deck ribs 202. The ribs 202 between the bottom and the top flutes of the steel deck 108 also form airways at the top of the shelter 100 and in the cavity between the ribs 202 of the roof deck 108 which lead to top element vent holes 208 along two sides of the deck. The top element vent holes 208, which run vertically through the top horizontal plate 173 of one or more top, horizontal, zee-shaped, steel wall top framing elements 168 forming the peripheral steel framing 178 of the roof deck 108, provide a means of passive ventilation of the shelter 100 from the inside of the shelter 100 through the cavities between the ribbed steel wall panels 182 and the exterior steel wall panel 189 and thence through exterior wall vent holes 212 in the exterior steel wall plate 189 which are covered by a welded, light gauge steel vent cowlings 194.

The Above Ground Steel Walls

The four walls 142 of the above ground portion 102 of the shelter 100 are constructed of a composite, light gauge steel assembly consisting of two dissimilar, but commonly available light gauge steel structural materials which, when bonded together using a high-strength, structural adhesive 216 form a structural element having strength and impact resistance substantially greater than the sum of the strengths and impact resistances of the individual components. The adhesive 216 bonds the steel components together and provides a non-corrosive moisture barrier in the joints of the connected materials to prevent moisture intrusion through the joints and into the shelter.

Figure 4:
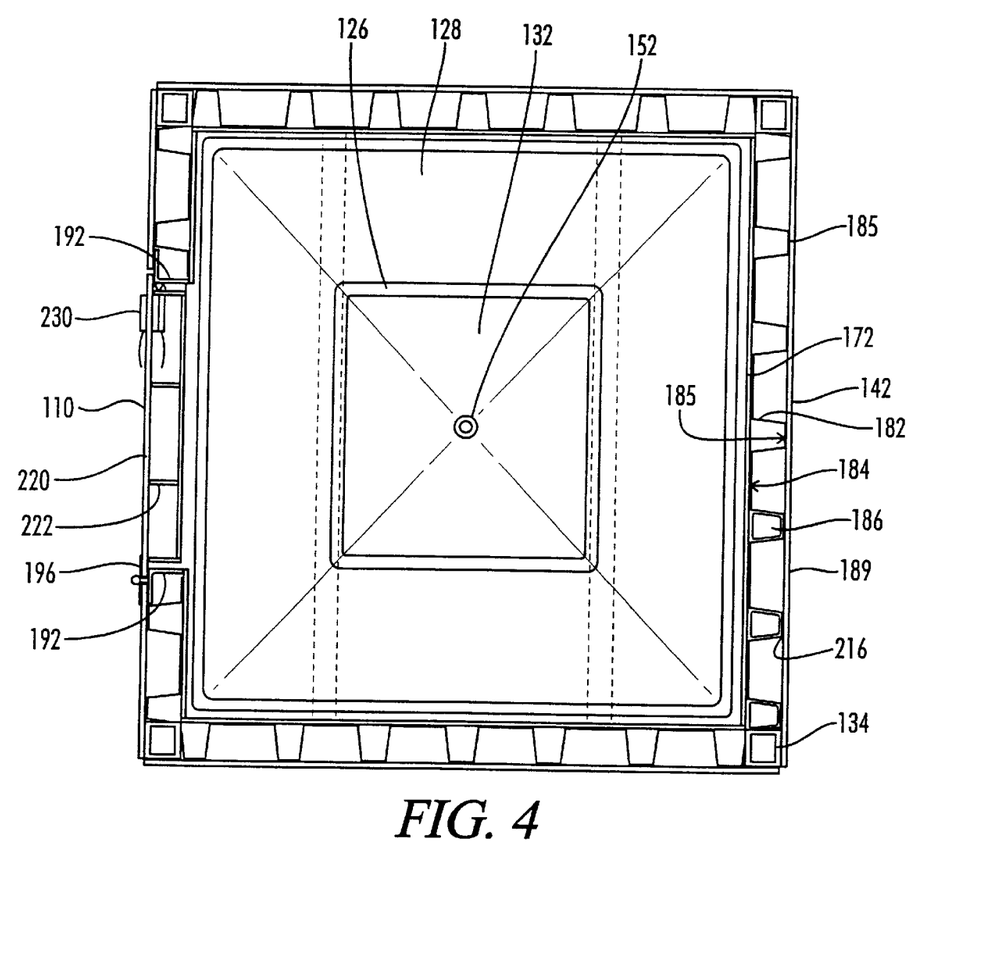
FIG. 4 is a top view section of the composite wall structure and tub of the present invention.

The exterior component wall panel 189 is a flat sheet of twelve gauge steel which provides the initial, inertial resistance to impacts from wind-borne missiles and falling objects striking the walls 142. The inside component wall panel 182 consists of light gauge, ribbed, steel deck. The wide, inside wall panel rib flutes 184 of the inside component wall panel 182 are adhered with two straight beads of one component, rapid curing, flexible polyurethane-based elastomeric bonding adhesive 216 to the inside vertical plates 167, 170 of the horizontal, zee-shaped, steel wall top framing element 168, and wall bottom framing element 166 at both the roof deck 108 and at the interface with the plastic tub 116 and the concrete foundation encasement 118. Exterior wall air vents 208, 212 vent cowlings 194, and doors 110 are provided in one or more of the walls 142. The exterior, steel wall plate 189 is adhered at its periphery to the tube legs 134 and horizontal, zee-shaped, steel framing wall bottom framing element 166, and wall top framing element 168 of the steel superstructure 160, using continuous, straight and zigzagged beads of adhesive 216, and to the ribbed wall panel 182 at each vertical rib 185, using two continuous beads of adhesive 216. A welded, twelve gauge, bent plate steel air vent cowling 194 is bonded with adhesive 216 and screwed to the exterior steel wall plate 189 over each pre-punched hole air vent 212 in the exterior wall plate 189. Where door assemblies 110 are installed, the edges of the light gauge exterior steel panels 189 adjacent to the door assembly 110 are also adhered to the vertical steel channel element door support framing 192 at each side of the doorway. The composite walls 142 also act as shear diaphragms which transfer lateral forces from intersecting walls 142 to the concrete foundation encasement 118.

In addition to the wide flutes 184 of the ribbed steel wall panels 182 bearing against, and being adhered to the bottom inside vertical plate 170 of the wall top framing element 168 and top inside vertical plate 167 of the wall bottom framing elements 166 of the superstructure 160, pre-cut, trapezoidal shaped blocks of styrofoam rib energy dissipation blocks 186 are also bonded with adhesive 216 into the cavities on the insides of the shelter walls 142 which are formed between the narrow flutes of the wall panel ribs 185 on the steel panel walls 142 and the top inside vertical plate 167 of the horizontal, zee-shaped wall bottom framing elements 166. The purpose of these styrofoam rib dissipation blocks 186 is to dissipate, when compressed or crushed, a portion of the kinetic energy resulting from missiles impacting the exterior surface of the walls 142, as described below.

Steel Door Assembly

FIG. 6 shows an interior view of the door or hatch assembly 110 and adjacent structural elements. The items arranged as would be seen from the inside of the shelter 100, the twelve gauge steel door plate 220, with intermittently welded one quarter inch thick by three inch deep horizontal and vertical, steel stiffener plates 222, has a continuous fourteen gauge stainless steel hinge 196 welded to the outside face of the twelve gauge steel door plate 220. The continuous steel hinge 196 is connected with threaded hinge fasteners extending through the exterior steel wall panel 189 to the hinge side, vertical steel door jamb channel door support framing 192. The outside face of the steel doorplate 220 is flush with the outside face of the exterior steel wall plate 189 when the door assembly 110 is closed. A one inch outside diameter steel pipe pull bar 228, flattened and rounded at each end, is welded to the four vertical steel stiffener plates 222. This steel pull bar 228 braces the four vertical stiffener plates 222 and provides a long, sturdy pull bar to manually grasp and pull the door assembly 110 to the closed position during extreme wind events. The steel door slam latching hardware 230, which is welded to the door plate 220, has beveled steel latch bolts 232 which extend through latch bolt holes 236 in the strike side door stiffener plate 222 and engage beveled steel door strikes 234 which are welded to the strike side, vertical steel door channel framing 192. Interior and exterior door latch opening levers 240, connected by a square steel shank 198, are provided on each door slam latch 230. The exterior door opening devices 230 may or may not have exterior locking devices with matching lock sets.

A jamming bolt lock assembly 242 provides an additional, positive locking device to secure the door assembly 110 against accidental opening during a tornado event. This locking assembly 242 consists of a threaded, stainless steel jamming nut 244 centered over a jamming bolt hole 246 in the strike side, vertical steel stiffener plate framing 222 and welded to the stiffener plate 222. The threads of the stainless steel jamming nut 244 engage the threads of a one half inch diameter stainless steel jamming bolt 248 which, when turned clockwise, extends into the gap between the stiffener plate 222 and the strike side, vertical steel door jamb channel framing 192. When fully extended, the jamming bolt 248 touches the door jamb channel framing 192. As the door 110 tends to open, the gap between the stiffener plate 222 and the door jamb channel framing 192 tends to close. The extended jamming bolt 248 prevents this gap from narrowing and thus prevents the door 110 from opening. The jamming bolt 248 is normally held in the open position by one or more very stiff locking hitch pins (not shown) or other devices not easily removed by small children to prevent accidental self-entrapment by small children.

Alternate Form of the Above Ground Shelter Anchored to a Concrete Slab

Figure 7:
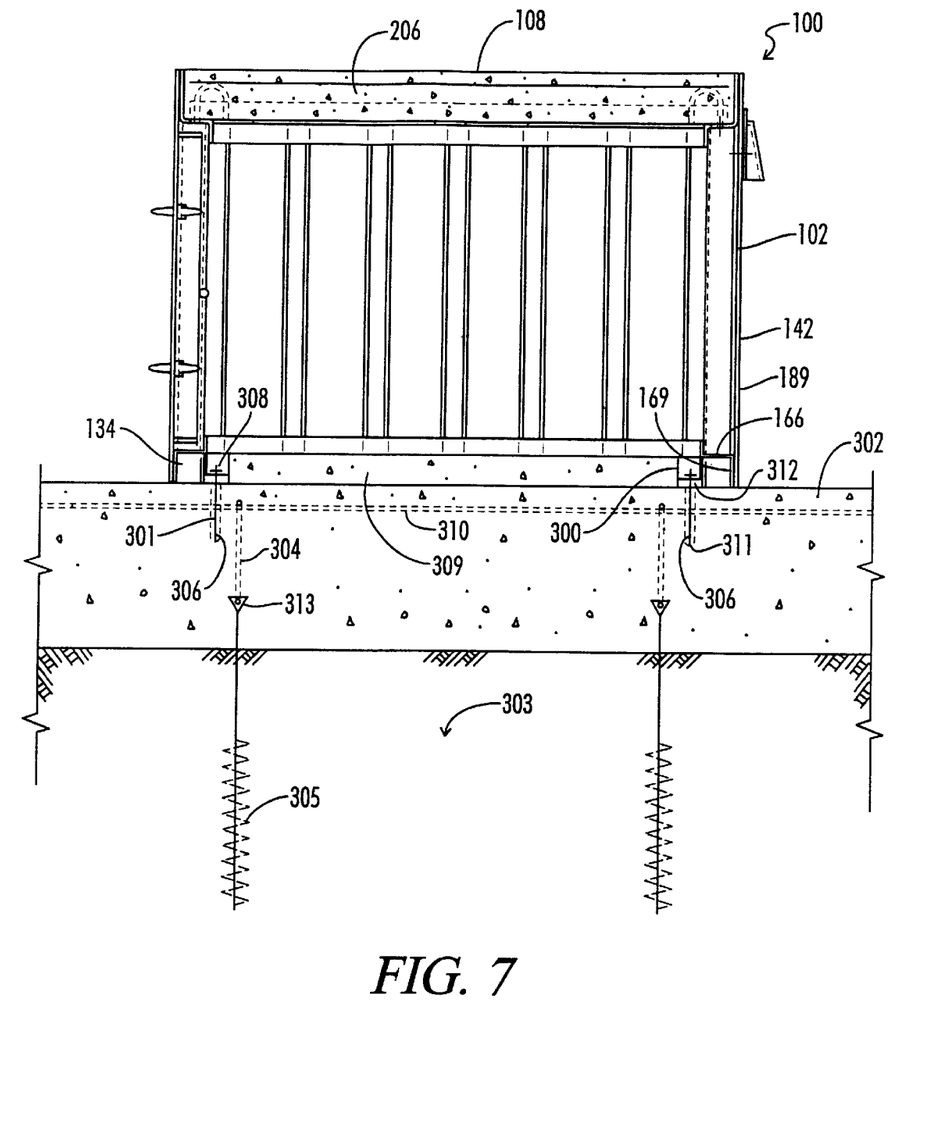
FIG. 7 of the drawing shows the above ground portion of the protective shelter mounted on a concrete slab with soil anchors.

As shown in FIG. 7, an alternate exemplary form of the present invention includes the above ground portion 102 of the protective shelter 100, which encompasses all of that portion of the superstructure 160 lying above the bottom edge of the bottom outside vertical plate 169 of each bottom horizontal framing element 166 and also above the bottom edge of the exterior wall plate 189 of the four above ground walls 142. The four vertical steel corner tubes 134 terminate at the bottom of the bottom horizontal framing elements 166 and exterior wall plates 189 with open ends to which welded steel anchor brackets 300 are attached by welding. This alternate above ground portion of the shelter 102 is anchored to a pre-constructed, level concrete slab or foundation 302 by means of four threaded steel anchors 301 with top nuts 308 which are anchored into drilled holes 311 in the concrete slab 302 with epoxy adhesive or cementitious grout 306 or by expansion devices which are a part of the threaded anchor 301. The threaded anchors 301 extend vertically through holes in the bottom horizontal plates 312 of the steel brackets 300 and are secured at the top with threaded nuts 308. The holes in the bottom horizontal plate 312 of the brackets 300 lie inside the walls of the shelter 100. This allows the anchor holes 311 to be drilled vertically from inside the shelter 100 and the threaded anchors 301 to be inserted vertically through the holes in the horizontal plates 312 of the four shelter anchor brackets 300. The threaded top nuts 308 engage the threads of the threaded anchor 301 on top of the horizontal plate 312 of the anchor bracket 300 to complete the connection. The four anchor bolts 301 and top nuts 308, engaging the four anchor brackets 300, provide all of the connectivity for the shelter 100 to resist uplift and lateral forces produced by a tornado.

A further improvement to the alternate embodiment includes a secondary concrete fill floor 309 inside the shelter 100 approximately three inches in thickness and extending between the outside bottom vertical legs 169 of the bottom horizontal framing elements 166. This concrete floor fill may be poured when the concrete fill 200 for the roof 108 is poured. The concrete fill 309 provides a smooth surface floor for shelter occupants, additional dead weight for uplift resistance, and stiffening of the bottom horizontal framing 166 for resistance against lateral wind forces and wind driven missile impacts on shelter walls 142 resulting from a tornado.

Where the thickness of the pre-constructed concrete slab 302 is insufficient to provide the dead weight or strength to resist uplift forces produced by a tornado, four or more soil auger anchors 305 may be installed in the subgrade 303 prior to construction of the concrete slab 302 or through holes which may be drilled through an existing concrete slab 302 and thence into the subgrade 303. The top attachment point 313 of the soil anchors 305 may engage vertical reinforcing bars with hooked ends 304 extending up to and engaging the slab top reinforcing 310. Where soil anchors 305 are installed through drilled holes in an existing concrete slab 302, the soil anchor top attachment point 313 or vertical reinforcing with hooked ends 304 may extend above the top of the existing concrete slab 302 into the concrete fill floor 309 and engage steel reinforcing which may be placed in the concrete fill floor 309 above the top of the existing concrete slab 302. A portion of the concrete for the concrete fill floor 309 is also placed in the holes (not shown) which are drilled through the concrete slab 302 to install the soil anchors 305.

Missile Impact Energy Dissipation Behavior of the Shelter Walls

Impact tests conducted at the Wind Engineering Research Center at Texas Tech University, Lubbock, Tex., yielded the following results which demonstrate the unique performance of the preferred embodiment of the wall system. As the result of post impact examination of the shelter walls 142 after multiple impact tests, including cannon-fired fifteen pound 2×4 boards impacting normal to the exterior surface of the walls 142 at a velocity of 100 miles per hour, the following energy dissipating mechanisms and impact results were discovered.

When the 2×4 missile impacted in the central region of the shelter exterior wall 142, ie: away from the periphery of the wall 142, the steel wall panel 189 permanently deformed in a shape concave to the exterior around the point of impact and inward toward the interior wall of the shelter. As the result of deformation of the exterior steel wall panel 189, the exterior flutes of the nearest rib or ribs 185 of the ribbed, steel wall panels 182 were permanently deformed toward the interior face of the shelter wall 142. This deformation was in the form of local crushing or buckling of the portions of the panel ribs 185 which are not parallel with the wall 142, with concomitant, permanent deformation of the narrow rib 185 of the ribbed wall panel 182 concave to the exterior of the shelter around the center of impact of the missile and toward the interior face of the shelter wall 142. These permanent deformations resulted in most of the kinetic energy of the impact being dissipated with only slight displacement of the wide, inside ribs 184 of the ribbed wall panel 182 into the shelter space.

When the 2×4 impacted the wall close to a peripheral corner tube 134 or zee-shaped, steel frame member 166, 168, the adhesive 216 bonding the exterior, steel wall plate 189 to the peripheral steel frame 160 was subjected to extreme tensile and shear forces. These strains resulted in localized stretching, tearing, rupturing, and un-bonding of the adhesive 216 between the distorted wall plate 189 and the non-distorted peripheral, steel support framing 160. This localized delamination of the wall components dissipated kinetic energy of the impacting 2×4. As the result of this delamination of connected parts, the exterior, steel wall panel 189 wrinkled and warped outward at the exterior edges of the plate and simultaneously deflected inward under the point of the 2×4 impact. The exterior steel wall panel 189 was deformed in a shape concave to the exterior around the point of impact and toward the interior face of the shelter wall 142. Both the plate deformations and the stretching, tearing, rupturing, and un-bonding of the adhesive 216 resulted in dissipation of kinetic energy of the impact. The effect on the adhesive 216 from these impacts was to induce instantaneous and residual tensile stresses, perpendicular to contact surfaces of the adhered steel, and shear stresses, parallel with the contact surfaces of the adhered steel. Both types of stress in the adhesive 216 resulted in dissipation of kinetic energy while limiting the displacement of the deformed exterior wall panel 189 toward the interior face of the shelter wall.

The inward deformation of the exterior wall plate 189 also resulted in permanent deformation of the ribs 185 of the ribbed, steel wall panels 182 at the point of impact and also near the closest point of contact between the ribbed, steel wall panels 182 and the zee-shaped steel, horizontal frame elements 166, 168. This permanent deformation of the narrow ribs 185 of the ribbed, steel wall panels 182 at the horizontal, zee-shaped, frame elements 166, 168, also crushed the trapezoidal shaped, styrofoam blocks 186. The combined permanent deformation of the steel wall panel ribs 185 and the styrofoam blocks 186 resulted in most of the kinetic energy of impact, which remained after deforming the exterior, steel wall panel 189, being dissipated, with only slight displacement of the wide, inside ribs 184 of the ribbed wall panel 182 toward the interior face of the shelter wall.

Latent Energy Dissipation of the Wall Panels

Subsequent to the impact tests, and over a period of several days, an anomalous behavior of the tested shelter walls was observed. The exterior steel wall plate 189 progressively, and in the absence of outside forces, continued to deform elastically in the manner of a slowly released spring as the bonding adhesive 216 progressively elongated, tore, ruptured, or un-bonded from the steel components in the vicinity of the impact. This phenomenon demonstrated that two principles of energy dissipation were operative during the missile impacts. The first was the nearly instantaneous, inertial resistance and inelastic deformation of the steel plate 189, ribbed deck 182, styrofoam blocks 186, and adhesive components 216 of the composite wall structure 142 which resulted from permanent deformation (bending, crushing, stretching, or tearing) of adhesive 216 and individual components. The energy dissipated by this inelastic or visco-elastic deformation of structural components of the wall is the (force-displacement) work required to produce these permanent deformations.

The second principle was transference of kinetic (mass-velocity) energy to potential (mass-displacement) energy. The latter type of energy is analogous to that attained by depressing an elastic spring into a latched position, the latch restraining the spring from releasing the strain energy of the spring. The ability of the invention to cause transference of kinetic energy of a missile impact to potential energy which is permanently or temporarily stored in the shelter walls is a significant feature of the invention. A substantial portion of the impact resistance of the wall 142, and the ability of the wall 142 to attenuate inward displacements which might otherwise result in injury to the occupants, result from the visco-elastic behavior of the adhesive 216 bonding the components of the wall, rendering the wall capable of storing energy from the instantaneous impact and releasing that latent, stored energy gradually in such a way that the long-term displacements are non-injurious.

Two additional energy dissipation effects were noted as the result of both peripheral and non-peripheral impacts on the walls 142. Localized, visco-elastic slippage strain of the adhesive 216 bonding the exterior, steel wall panel 189 to the narrow ribs 185 of the ribbed steel wall panels 182 and of adhesive 216 bonding the wide ribs 184 of the ribbed steel wall panels 182 to the vertical legs of the zee-shaped, steel, horizontal elements 166, 168 was observed. Both deformations resulted in the bonded metals slipping, relative to one another, parallel with their bonded surfaces. These localized adhesive 216 strains, in addition to inertial resistance of the wall 142 and the shattering of the impacting 2×4 board, resulted in dissipation of that portion of the kinetic energy imposed by the missile impacts which was not converted to potential energy or otherwise dissipated, as previously described. The short term, localized adhesive strains are so small that the composite steel wall structure 142 retains adequate strength and resilience to resist multiple missile impacts and wind induced inward and outward pressures without degrading the shelter walls 142. The interior wall face deformations produced by multiple impacts during tests remained well within limits deemed by the testing agency to be non-threatening to the shelter occupants.

Small Arms Fire Capability of Wall Structure

Small arms fire, including thirty-eight caliber, three fifty seven magnum with full metal jacket, and forty-five caliber pistol rounds, were directed at the composite walls 142 of the tornado shelter in accordance with Underwriters Laboratories and National Institute of Justice procedures. The small arms fire did not penetrate the twelve gauge exterior wall plate 189. The ability of the composite wall 142 to resist high velocity bullets in addition to the slower and heavier impacts of fifteen pound two-by-four boards fired at one hundred miles per hour indicates that the composite wall panels 142 have a wide range of potential applications for providing impact resistance for building exteriors and sensitive interior rooms or for larger shipping containers for sensitive contents.

The composite wall panels 142 would be able to resist wind forces and missile impacts of tornadoes, small arms fire, shrapnel, explosive blast forces, and impacts of blast-driven missiles when wall panels 142 are configured in greater lengths so as to create full-sized building cladding walls which are supported at intermediate points by cross bracing. Current guidelines for the design and construction of impact-resistant missile barriers for Department of Energy Facilities currently do not include steel cladding or composite steel cladding. The only materials currently recommended for such facilities are reinforced concrete, clay brick, or masonry.

Therefore, the unique impact-resistant features of the composite steel wall 142 as described for this invention are not limited to the tornado shelter application, but may be employed to provide pressure and impact resistance for a large number of known and unforeseen applications.

Finally, although there have been described particular embodiments of the present invention of a new and useful Tornado Shelter With Composite Structure and Concrete Tub Encasement, it is not intended that such references be construed as limitations upon the scope of this invention except as set forth in the following claims.

What is claimed is:

1. A protective shelter for installation above and in the ground, comprising:

a superstructure including a top, a side, and a base connecting an above ground shelter portion and a below ground shelter portion;

the above ground portion including a shelter roof deck supported on the top of the superstructure and a shelter wall attached to the side of the superstructure;

the below ground portion including a tub encased about the outside and underside with a concrete foundation encasement which secures the superstructure base in the ground and provides resistance against upward and lateral forces;

the superstructure including column legs secured in the concrete foundation encasement;

wall top framing elements attached to the column legs, wherein the wall top framing elements form an outside edge of the shelter roof deck and an upper support for the shelter wall; and wall bottom framing elements at the interface between the concrete foundation encasement and the shelter wall, wherein the wall bottom framing elements form a bottom support for the shelter wall.

2. The protective shelter of claim 1, the steel superstructure further including encasement cross framing attached to the legs for supporting the tub and anchoring the superstructure in the encasement.

3. The protective shelter of claim 2, the cross framing including binders between the legs and tub supports spanning these binders to provide anchorage of the superstructure into the encasement and support and protection for the tub.

4. The protective shelter of claim 1, the steel superstructure base further including leg base plates to provide anchorage of the superstructure into the encasement.

5. The protective shelter of claim 1, the superstructure including steel lifting loops at the corners of the roof deck.

6. The protective shelter of claim 1, the shelter roof deck including
a concrete roof deck mounted on a ribbed panel with ribbed deck flutes and raised embossments for engaging the concrete roof deck and a wire reinforcing mesh rigidly supported within the concrete roof deck at a distance between the ribbed deck flutes and the top of the wall top framing elements.

7. The protective shelter of claim 1, the shelter wall constructed from a composite of materials including
an exterior wall plate adhered at its periphery to the tube legs, wall bottom framing element, and wall top framing element of the superstructure using beads of adhesive;
an inside wall panel with wall panel rib flutes adhered to the exterior wall plate at each panel rib flute using beads of adhesive, and also adhered with beads of adhesive to both the wall top framing element and wall bottom framing element; and
energy dissipation blocks adhered with adhesive between the ribbed wall panels and wall bottom framing elements.

8. The protective shelter of claim 1, the shelter wall further comprising:
an air vent in the exterior wall plate; and
an air vent cowling bonded with adhesive and screwed to the exterior wall plate over each air vent in the exterior wall plate.

9. The protective shelter of claim 1, the shelter wall further comprising:
an access door assembly including door support framing mounted to the shelter wall.

10. The protective shelter of claim 9, the door assembly including:
a doorplate with a pull bar attached to stiffener plates connected to the door plate, and a hinge connected to the door support framing;
the doorplate supporting door latching hardware.

11. The protective shelter of claim 9, the door assembly including:
A jamming bolt lock assembly including a threaded jamming nut centered over a jamming bolt hole in stiffener plate framing, and a jamming bolt engaging the jamming nut, wherein the jamming bolt may be extendably rotated to contact the door framing.

12. The protective shelter of claim 1, wherein the tub is water impervious to allow for the shelter to be employed in regions where the water table is close to the ground surface.

13. The protective shelter of claim 1, wherein the tub includes both vertical tub walls and horizontal surfaces to provide structural strength.

14. The protective shelter of claim 1, wherein the tub includes a stepped, pre-molded tank that provides a water impervious shell, steps, tub seats, seat-backs, and a tub floor.

15. The protective shelter of claim 1, further comprising:
a drain pipe connected to the tub and opening into a gravel drain.

16. The protective shelter of claim 15, further comprising:
a drain plug for sealing the drain pipe.

17. A method for constructing a protective shelter including a tub form and a superstructure, comprising:
installing the tub form for the on-site pouring of a foundation encasement on an outside and an underside of the form;
providing downward force such that the superstructure is not floated out of the excavation when the encasement is poured;
pouring the foundation encasement under and around the form to engage the superstructure and provide the anchorage and ballast for resistance against windstorm uplift and overturning forces; and
removing the downward force after the concrete encasement has reached initial set stage.

18. An energy absorbing compound wall structure for dissipating, transferring, and converting to potential energy the kinetic energy of a missile impact, wherein the potential energy is permanently or temporarily stored in shelter walls for protecting objects stored in a protective area, the wall structure comprising:
a support frame with inside vertical elements and outside vertical elements;
an exterior wall panel bonded at its peripheries to the outside vertical elements;
an inside wall panel with wall panel rib flutes bonded to the exterior wall panel at the outside panel rib flutes, and also bonded to the inside vertical elements at the inside panel rib flutes; and
an energy dissipation block fixably positioned between the outside panel rib flute and the inside vertical element of the frame.

19. The energy absorbing compound wall structure of claim 18, wherein the bonding of the frame, exterior wall panel, and inside wall panel includes an adhesive including first, second, and third term strength properties
wherein the first term strength properties allow the adhesive to dissipate energy by local delamination and transfer energy between the panels and frame;
wherein the second term strength properties allow the adhesive to bond the panels and the frame for a period of temporary storage of the potential energy in the shelter wall; and
wherein the third term strength properties allow the adhesive to delaminate and release the temporarily stored potential energy in the wall.

* * * * *